(12) United States Patent
Pavlovic et al.

(10) Patent No.: US 7,613,003 B2
(45) Date of Patent: Nov. 3, 2009

(54) ELECTRICAL CONNECTOR

(75) Inventors: Slobodan Pavlovic, Canton, MI (US); David Menzies, Linden, MI (US); Mohamad Zeidan, Dearborn Heights, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/999,930

(22) Filed: Dec. 7, 2007

(65) Prior Publication Data
US 2009/0149048 A1 Jun. 11, 2009

(51) Int. Cl.
*H05K 7/20* (2006.01)
(52) U.S. Cl. ...................................... 361/709
(58) Field of Classification Search ............... 439/709, 439/138; 361/117, 127, 126, 119, 760
See application file for complete search history.

(56) References Cited

U.S. PATENT DOCUMENTS

| 3,938,068 | A | 2/1976 | Hagan |
| 5,372,515 | A * | 12/1994 | Miller et al. ................ 439/138 |
| 6,396,380 | B1 | 5/2002 | Girke et al. |
| 6,545,861 | B1 | 4/2003 | Hayes et al. |
| 6,548,916 | B1 | 4/2003 | Kanazawa et al. |
| 6,668,963 | B2 | 12/2003 | Nada |
| 6,731,489 | B2 * | 5/2004 | Heidorn et al. ............. 361/119 |
| 6,860,357 | B2 | 3/2005 | Hayakawa |
| 7,046,115 | B2 | 5/2006 | Higuchi et al. |
| 2002/0146878 | A1 * | 10/2002 | Ohnakado et al. ........... 438/215 |

* cited by examiner

*Primary Examiner*—Jean F Duverne
(74) *Attorney, Agent, or Firm*—MacMillan, Sobanski & Todd, LLC

(57) ABSTRACT

A high voltage electrical connector includes a connector body. A first connector is supported within the connector body. A second connector is supported within the connector body and electrically connected to the first connector. A high voltage circuit protection device is electrically connected between the first connector and the second connector.

19 Claims, 5 Drawing Sheets

ELECTRICAL CONNECTOR

BACKGROUND

Various embodiments of an electrical connector are described herein. In particular, the embodiments described herein relate to an improved—electrical connector for use in a vehicle.

Electric vehicles and hybrid vehicles having an electric, battery driven motor are becoming increasingly common in the marketplace. Such electric and hybrid vehicles require a high voltage distribution box. The high voltage distribution box can be expensive to produce and the fuses contained therein can be difficult to replace.

Additionally, such known high voltage distribution boxes must be sealed, shielded, and have a high voltage interlock loop (HVIL) connected to the power source to disconnect power if a connector is removed from the distribution box.

It is therefore desirable to provide improved packaging for the high voltage circuit protection required in electric and hybrid vehicles.

SUMMARY

The present application describes various embodiments of a high voltage electrical connector. One embodiment of the high voltage electrical connector includes a connector body. A first connector is supported within the connector body. A second connector is supported within the connector body and electrically connected to the first connector. A high voltage circuit protection device is electrically connected between the first connector and the second connector.

Other advantages of the high voltage electrical connector will become apparent to those skilled in the art from the following detailed description, when read in light of the accompanying drawings.

DETAILED DESCRIPTION

Figure 1:
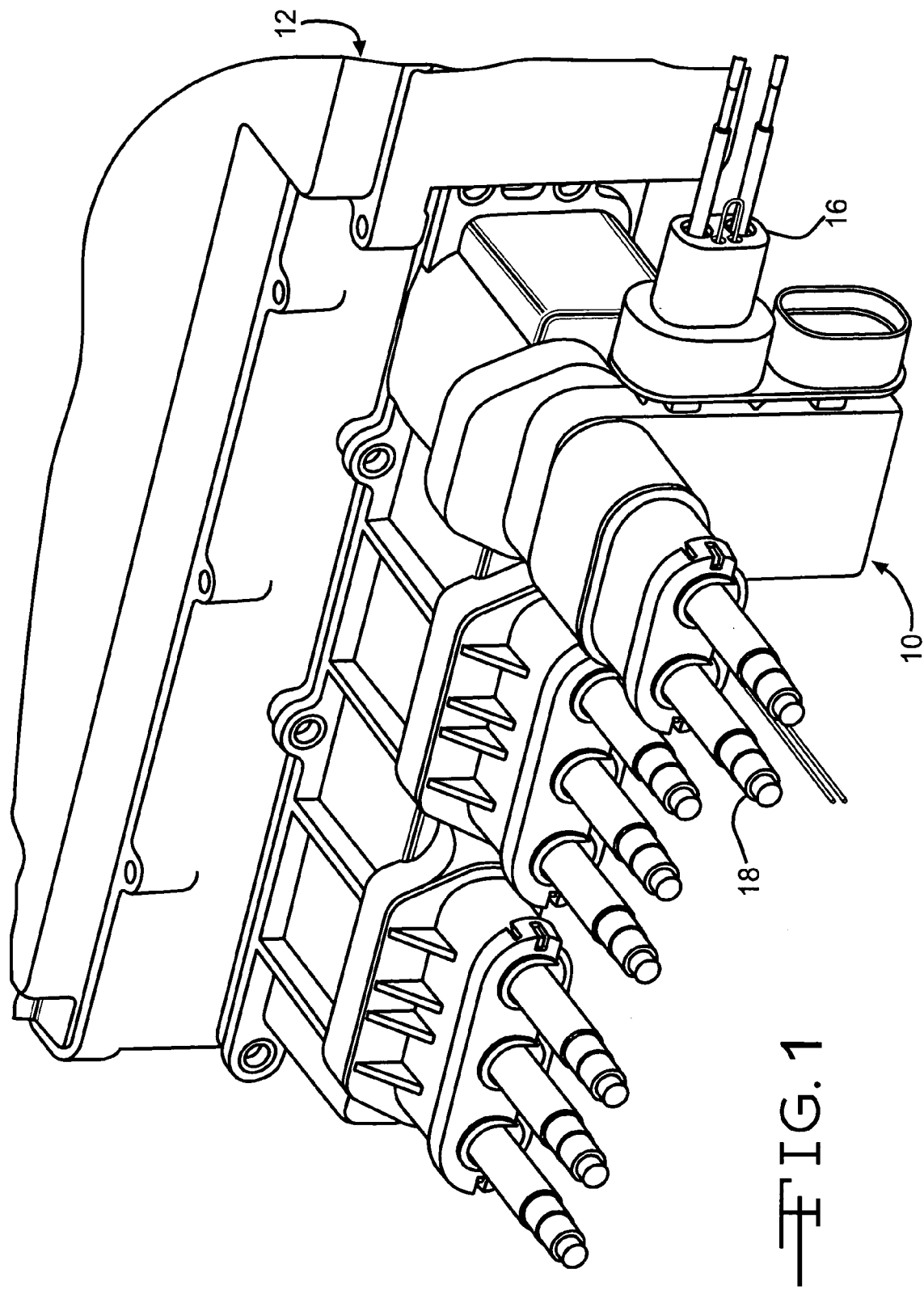
FIG. 1 is a perspective view of a first embodiment of a high voltage electrical connector, shown attached to a power source.

Referring now to the drawings, there is illustrated in FIG. 1 a first embodiment of a high voltage electrical connector, indicated generally at 10. The illustrated high voltage electrical connector 10 is connected to a high voltage power supply, such as an inverter 12, by a first connector 14 (not shown in FIG. 1, but illustrated in FIG. 4). The illustrated embodiment of the high voltage electrical connector 10 is also shown with a second load connector 16, for connecting the high voltage electrical connector 10 to a high voltage device. Examples of such devices include a high voltage air conditioning compressor (not shown), a conventional or a positive temperature coefficient (PTC) heater (not shown), and a power steering system (not shown). A third load connector 18 is shown and may be used for connecting the high voltage electrical connector 10 to a power supply, such as a high voltage battery (not shown).

Figure 2A:
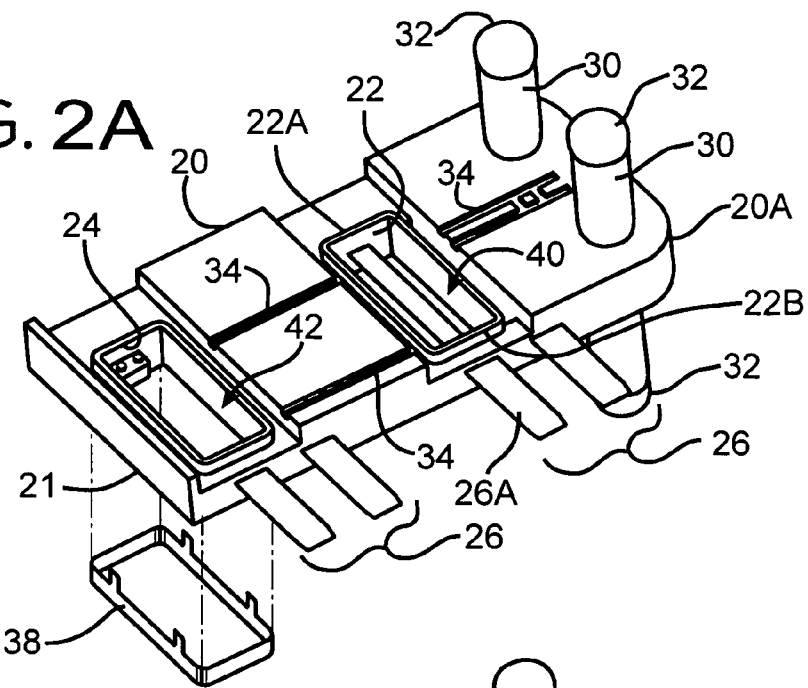
FIG. 2 is a perspective view of a portion of the high voltage electrical connector illustrated in FIG. 1, shown prior to being completely assembled.
Figure 2B:
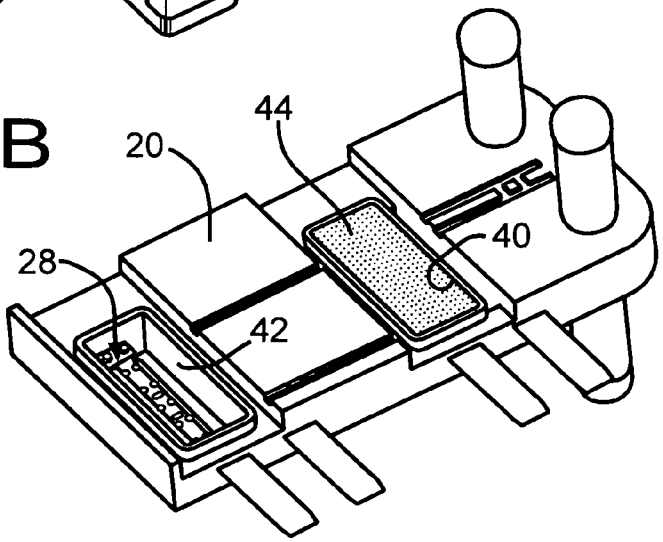
Figure 2C:
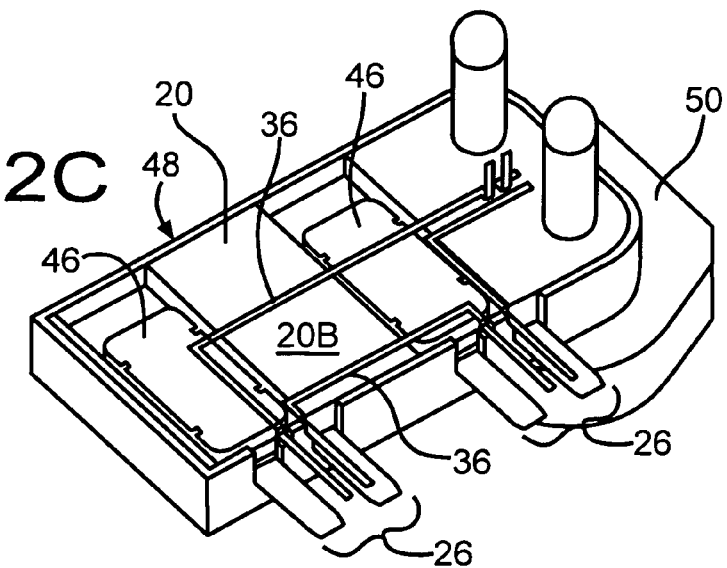

The high voltage electrical connector 10 includes a first body portion 20. The embodiment of the first body portion 20 illustrated in FIGS. 2A through 2C is formed of plastic, such as for example, high temperature polyamide (PA), polyphthalamide (PPA), or other desired high temperature resistant thermoplastic materials. The first body portion 20 includes openings 22 and 24 for one of a pair of bus bars 26. In the illustrated embodiment, two openings 22 and 24 and two pair of bus bars 26 are shown. Alternatively, any desired number of pairs of bus bars 26 and corresponding openings 22 and 24 can be used, such as for example one opening and one pair of bus bars 26, or three openings and three pair of bus bars 26. It will be understood that the first body portion 20 may have any shape required to fit within an electrical system.

In the embodiment described and illustrated herein, the bus bars 26 are integrally formed with the first body portion 20, such that one (i.e., the bus bars 26A in FIG. 2A) of each pair of bus bars 26 extends from a first end 22A of the opening 22 to a second end 22B of the opening 22. In a secondary manufacturing step, a portion of the bus bar 26A is removed from the opening, such as the opening 24, to accommodate a fuse 28, as will be described in detail below. The bus bars 26 may be formed from copper. Alternatively, the bus bars 26 may be formed from any other desired conductive material, such as copper alloys, copper clad aluminum and steel, aluminum, and other desired metals.

A pair of first connectors or pins 30 extends transversely through the first end 20A of the first body portion 20. The pins 30 may be formed from copper. Alternatively, the pins 30 may be formed from any other desired conductive material, such as copper alloys, copper clad aluminum and steel, aluminum, and other desired metals. The illustrated pins 30 include overmolded protective plastic end caps 32. It will be understood that the end caps 32 are not required, and that such end caps 32 need not be overmolded and may attached to the pins 30 by any desired means, such as with an adhesive.

Figure 3:
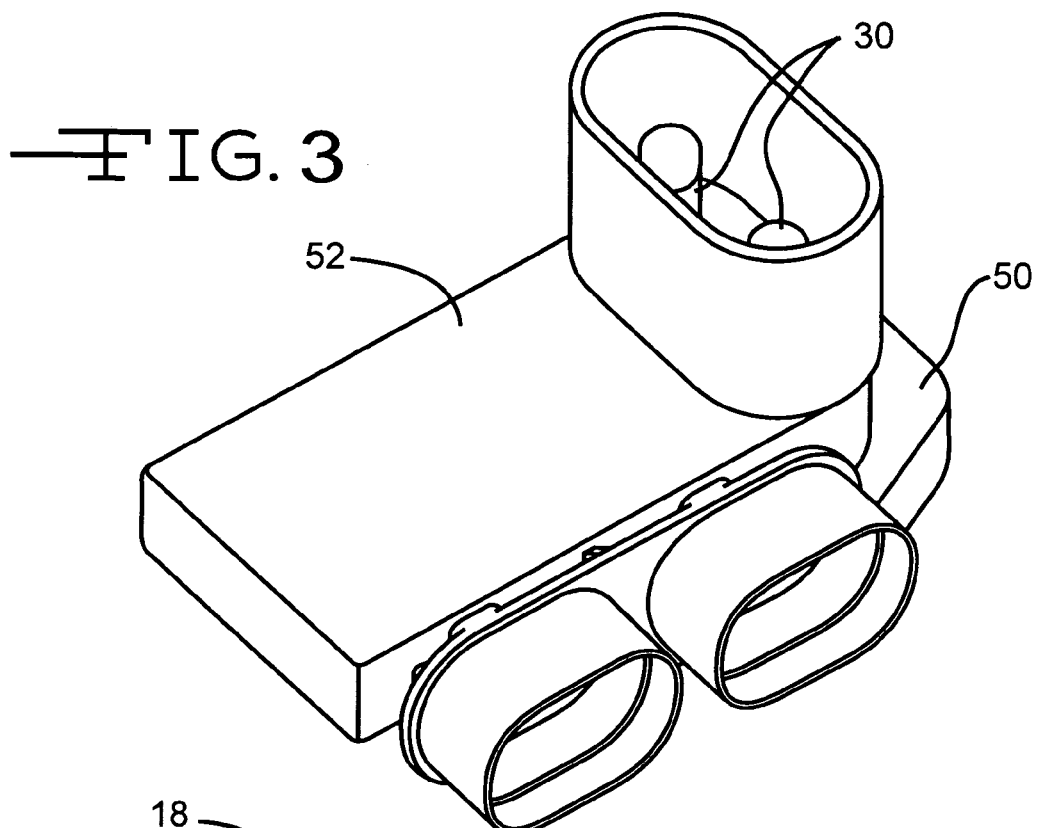
FIG. 3 is a perspective view of a portion of the high voltage electrical connector illustrated in FIG. 1, shown prior to being completely assembled.

The illustrated first body portion 20 includes channels 34 for receiving and mounting high voltage interlock loop (HVIL) bus bars 26, as best shown in FIG. 3.

A high voltage fuse 28 may be attached, such as by welding or soldering, to the bus bar 26A within the openings 22 and 24. Alternatively, other circuit protection devices, such as for example, PTC and circuit breakers may be used. In the illustrated embodiment, after the fuse 28 is attached to the bus bars 26A, first covers 38 may be attached to a bottom surface (as viewed in FIG. 2A) of the first body portion 20 about the openings 22 and 24. In the illustrated embodiment, the covers 38 are snap fit to the bottom surface 21 of the first body portion 20. Once the covers 38 are attached, the covers 38 and the openings 22 and 24 define cavities 40 and 42.

In a subsequent step of the manufacturing process, the cavities 40 and 42 may be filled with quartz sand 44, as best shown in FIG. 2B. Alternatively, the cavities 40 and 42 may be filled with any other desired material, such as for example, non-flammable foam. In the illustrated embodiment, after the quartz sand 44 is disposed within the cavities 40 and 42, second covers 46 may be attached to a top surface 20B of the first body portion 20 about the cavities 40 and 42. In the illustrated embodiment, the covers 46 are snap fit to the top surface 20B of the first body portion 20, thereby defining a first connector subassembly 48.

In another step of the manufacturing process, the subassembly 48 may be placed in a molded plastic holder 50, as best shown in FIG. 2C. The holder 50 provides nesting and shut-off surfaces for subsequent overmolding. It will be understood that the holder 50 may have any shape required to fit within an electrical system.

In a further step in the manufacturing process, HVIL bus bars 36 are disposed within the channels 34. The HVIL bus bars 36 may be formed from copper. Alternatively, the HVIL bus bars 36 may be formed from any other desired conductive material, such as copper alloys, copper clad aluminum and steel, aluminum, and other desired metals. The HVIL circuit formed by the HVIL bus bars 36 is a daisy chain circuit with outside protection, such that if any of the connections, e.g., through the second and/or third connectors 16 and 18 become disconnected, the circuit is opened.

In another step of the manufacturing process, a device body 52 may be formed about the holder 50 containing the subassembly 48, as best shown in FIG. 3. The device body 52 may be formed from plastic, such as for example, PA, polybutylene terephthalate (PBT), or other desired thermoplastic material, in an overmolding process. Alternatively, the device body 52 may be formed in two or more pieces (not shown) and assembled about the holder 50 containing the subassembly 48. The multiple pieces of such a multiple piece device body 52 may then be bonded together by any desired method, such as sonic welding, thermal welding, inductive welding, laser welding, and the like. It will be understood that the first device body 52 may have any shape required to fit within an electrical system.

Once the device body 52 is formed, an outer or shielding layer may be applied over the device body 52. In one embodiment, the shielding layer is formed by applying a conductive plastic material over the device body 52 in an overmolding process. One example of such a conductive plastic is PA filled with steel fibers or other conductive fibers and/or particles. In another embodiment, the shielding layer is formed by applying a layer of nickel over a layer of copper in a plating process. Alternatively, any other desired method of applying a shielding layer may be used, such as for example, conductive paint and metal mesh. A conductive connector seal 54 may then be disposed about a pin shield portion 56 of the high voltage electrical connector 10. The connector seal 54 may be formed from any desired conductive material, such as for example, silicone rubber filled with steel fibers or other conductive fibers and/or particles.

The overmolded device body 52 provides a protective cover or housing over the holder 50 and the subassembly 48, thereby increasing the robustness of the high voltage electrical connector 10. Additionally, the maximum possible voltage for the connector 10 is increased because the combination of the additional plastic material surrounding the fuse wall by the first body portion 20 and the overmolded device body 52 allows the connector 10 to handle higher levels of pressure and heat that can develop during fuse 28 deployment and use.

Figure 4:
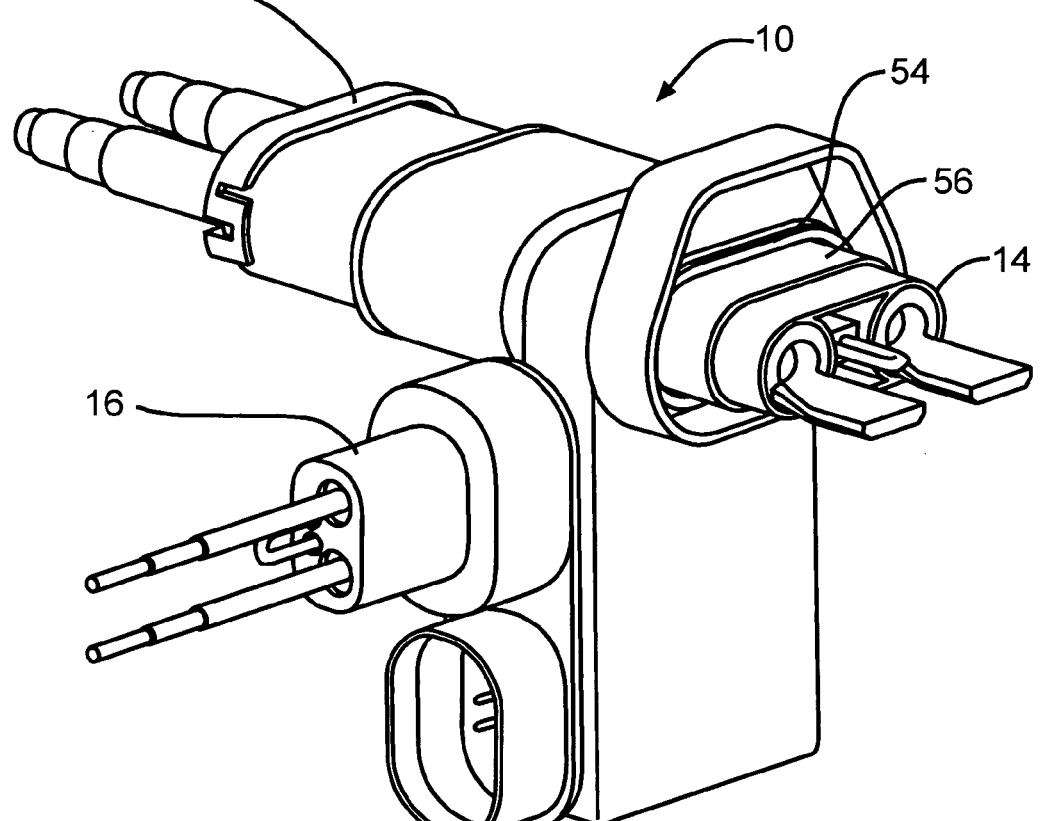
FIG. 4 is a perspective view of the first embodiment of a high voltage electrical connector illustrated in FIG. 1.

As best shown in FIG. 4, the first connector 14 may be any desired type of connector suitable for attachment to the inverter 12. The second and third load connectors 16 and 18 may be any type of connector, such as a pigtail connector 100 illustrated in FIGS. 5A through 5C. Advantageously, an HVIL is not required when a pigtail connector is used, because of the protection provided by the high voltage fuse 28 mounted within the high voltage electrical connector 100.

Figure 5A:
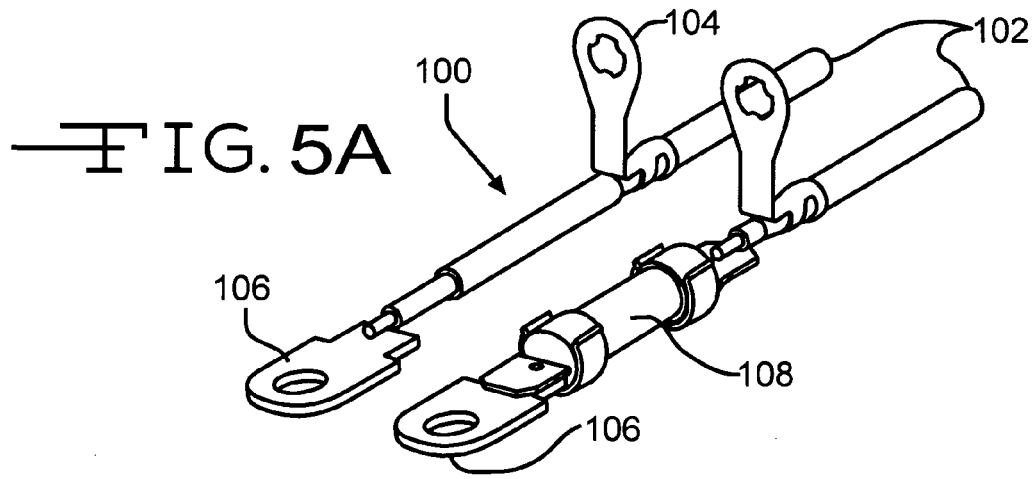
FIG. 5 is a perspective view of a second embodiment of the high voltage electrical connector illustrated in FIG. 1.
Figure 5B:
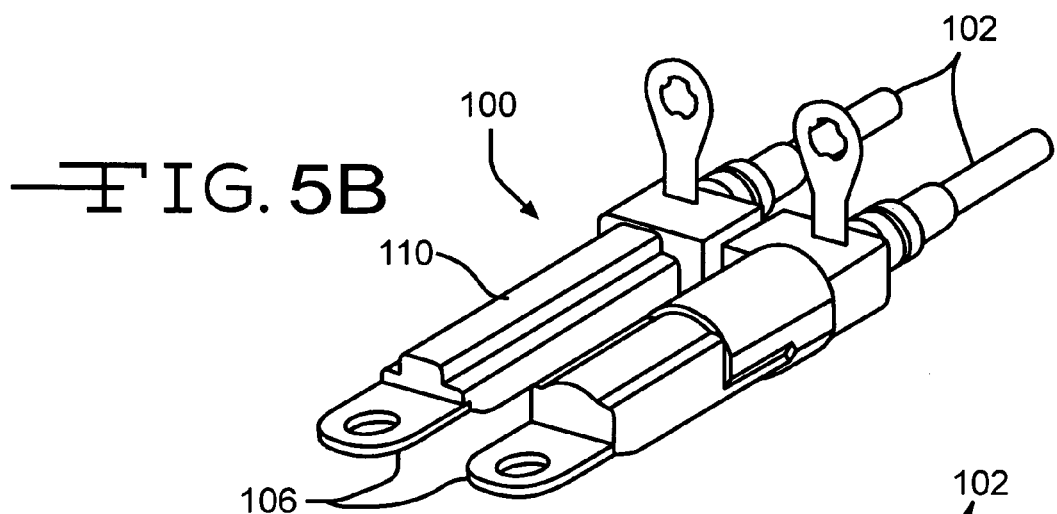
Figure 5C:
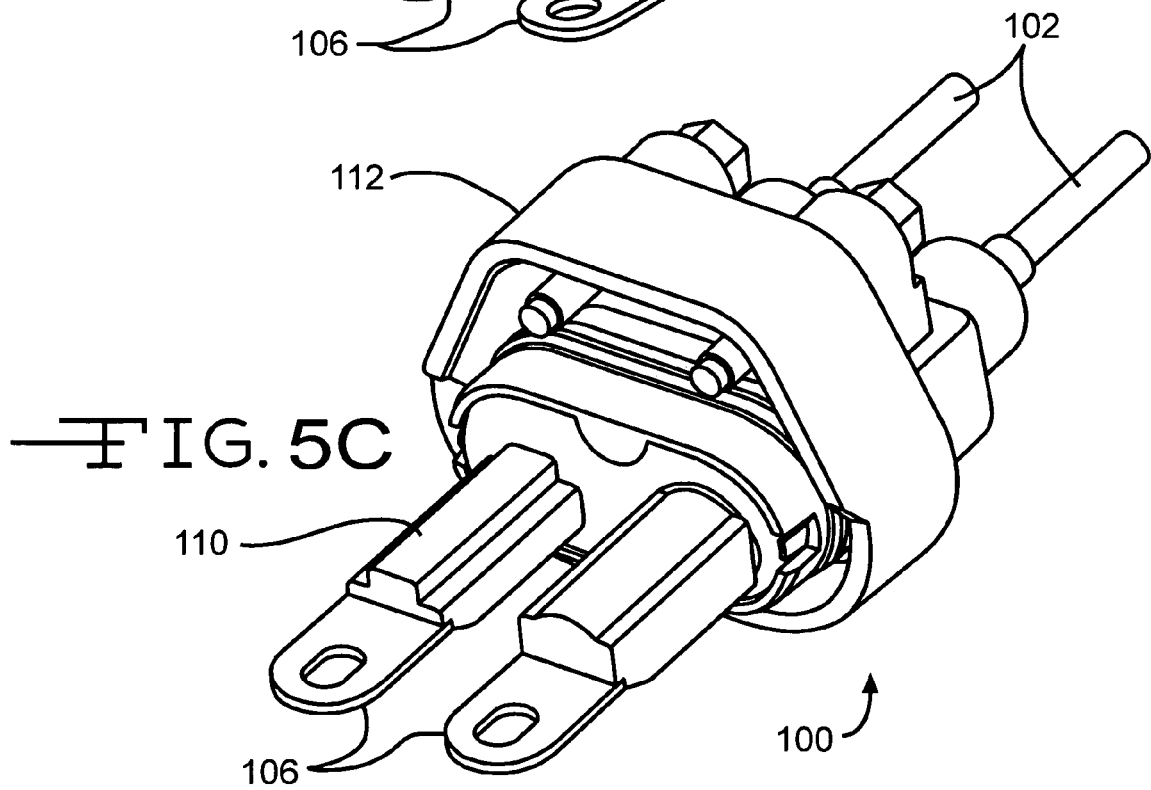

A second embodiment of the high voltage electrical connector is indicated generally at 100 in FIGS. 5A through 5C. The illustrated connector 100 includes a pair of wires 102, each having an eyelet terminal 104 mounted thereto. Each of the wires 102 terminates in flat ring terminal 106. One of the pair of wires 102 includes a fuse 108 attached between the wire 102 and the flat ring terminal 106.

As best shown in FIG. 5B, the fuse 108 and a portion of the pair of wires 102 is enclosed in a first body portion 110. The embodiment of the first body portion 110 illustrated in FIG. 5B is formed of plastic, such as for example, PA, PBT, or other desired thermoplastic material. Once the first body portion 110 is formed, a shielding layer may be applied over the first body portion 110. It will be understood that the first body portion 110 may have any shape required to fit within an electrical system.

As best shown in FIG. 5C, a device body 112 may be formed about the first body portion 110. It will be understood that the device body 112 may have any shape required to fit within an electrical system. As described above regarding the connector 10, the shielding layer may be any desired conductive layer, such as conductive plastic material, a layer of nickel over a layer of copper, conductive paint, or metal mesh.

The device body 112 may be formed from plastic in an overmolding process. Examples of suitable plastics include for example, PA filled with steel fiber or other conductive fibers and/or particles, plateable plastic material, plastic suitable for the application of conductive paint, and plastic with metal mesh integrally molded therein.

Figure 6A:
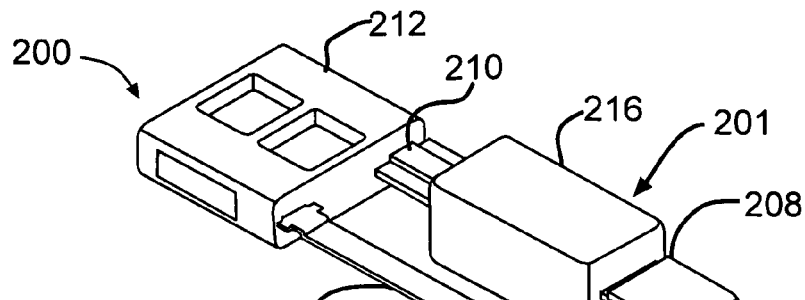
FIG. 6 is a perspective view of a third embodiment of the high voltage electrical connector illustrated in FIG. 1.
Figure 6B:
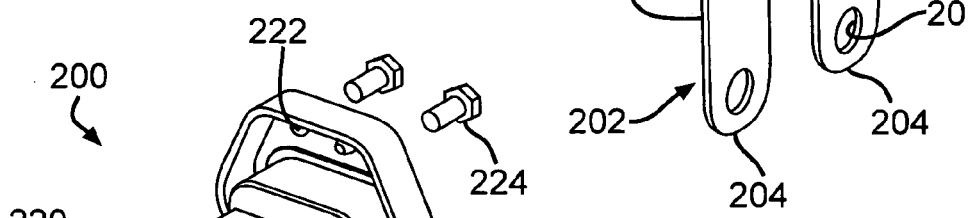
Figure 6C:
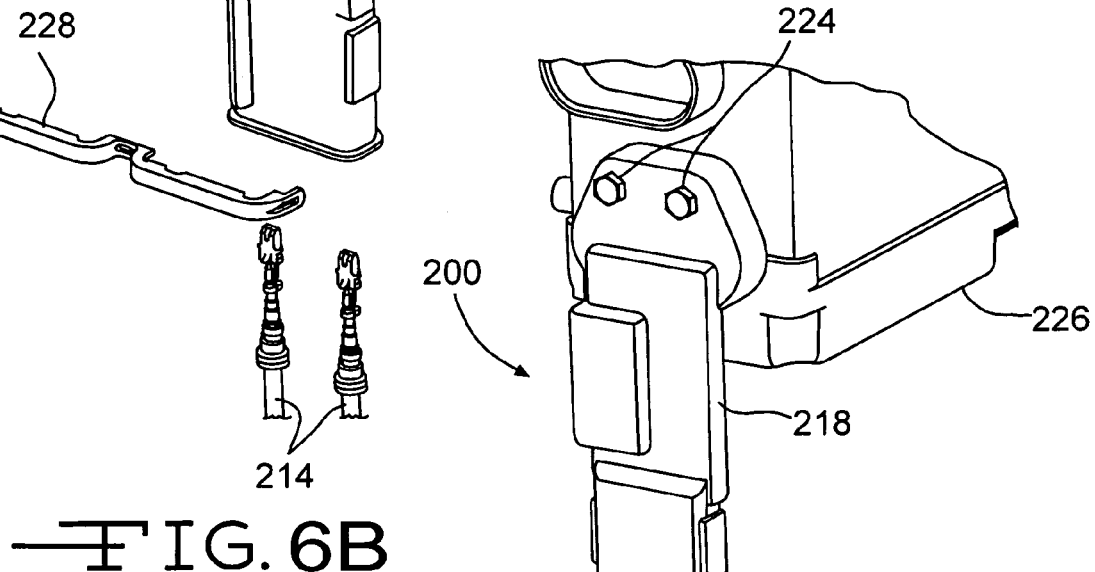

A third embodiment of the high voltage electrical connector is indicated generally at 200 in FIGS. 6A through 6C. The illustrated connector 200 includes a connector subassembly, shown generally at 201 in FIG. 6B. The subassembly 201 includes a pair of bus bar assemblies 202, each having a substantially L-shaped first bus bar portion 202A having a mounting aperture 203 formed at a first end 204 thereof. A first end 206 of a second bus bar portion 202B is attached, such as by welding or soldering, to a second end 208 of the first bus bar portion 202A. A second end 210 of the second bus bar portion 202B terminates at a plastic cavity block 212. The second end 212B of the cavity block 212 may include openings (not shown) for receiving the male connectors, such as the harness leads 214, shown in FIG. 6B. It will be understood that the cavity block 212 may have any shape required to fit within an electrical system.

A portion of one of the second bus bar portions 202B may be removed and a high voltage fuse (not shown) may be attached, such as by welding or soldering, to the second bus bar portion 202B. In the illustrated embodiment, the fuse is enclosed in a fuse housing 216. The fuse housing 216 is formed of plastic, such as for example, high temperature PA, PPA, or other desired high temperature resistant thermoplastic materials. It will be understood that the fuse housing 216 may have any shape required to fit within an electrical system.

As best shown in FIG. 6B, the subassembly 201 is enclosed in a device body 218. The embodiment of the device body 218 illustrated in FIG. 6B is formed of plastic, such as for example, PA, PBT, or other desired thermoplastic material. It will be understood that the device body 218 may have any shape required to fit within an electrical system. Once the device body 218 is formed, a shielding layer may be applied over the device body 218. As described above regarding the connector 10, the shielding layer may be any desired conductive layer, such as conductive plastic material, a layer of nickel over a layer of copper, conductive paint, or metal mesh.

A conductive connector seal 220 may then be disposed about the portion of the device body 218 surrounding the exposed portions of the bus bar assemblies 202. The connector seal 220 may be formed from any desired conductive material, such as for example, silicone rubber filled with steel fibers or other conductive fibers and/or particles.

The connector 200 may also include apertures 222 formed at a first end 200A of the connector 200 for receiving fasteners 224 for mounting the connector 200 to a power supply 226, as shown in FIG. 6C. The connector 200 may also include a terminal position assurance (TPA) member 228 attached to the second end 200B of the connector 200.

An advantage of the high voltage electrical connectors 10, 100, 200 described and illustrated herein is that the connectors 10, 100, 200 are serviceable parts that can be easily replaced if one of the circuit protection devices, such as the fuse 28, is opened due to circuit overload.

An advantage of the high voltage electrical connectors 10, 100, 200 is that having a circuit protection device that can be reset, such as a circuit breaker, allows the connector 10, 100, 200 to be used multiple times without having to be replaced.

Another advantage of the high voltage electrical connectors 10, 100, 200 is that the requirement for a separate box, such as a power distribution box or a power distribution center, is eliminated. Additionally, vehicle operator safety is also improved as the connector 10 may be replaced without the need to access and contact a power distribution box.

Another advantage is the relative ease in which the connectors 10, 100, 200, with integrated fuses 28, 108 may be assembled to a power supply, such as the inverter 12. For example, the connector 10 is structured and configured to be easily plugged in to the inverter 12. Additionally, the connector 200 is structured and configured to be attached by fasteners 224 to the power supply 226.

Another advantage of the high voltage electrical connectors 10, 100, 200 is that the number of sealed, shielded high voltage interfaces is reduced, the complexity and cost of the high voltage electrical system is reduced, and the reliability of the high voltage electrical system is increased.

The principle and mode of operation of the high voltage electrical connector have been described in its various embodiments. However, it should be noted that the high voltage electrical connector described herein may be practiced otherwise than as specifically illustrated and described without departing from its scope.

What is claimed is:

1. A high voltage electrical connector comprising:
   a connector body, wherein the connector body is formed from non-conductive material and includes an outer layer formed from conductive material
   a first connector supported within the connector body;
   a second connector supported within the connector body and electrically connected to the first connector; and
   a high voltage circuit protection device electrically connected between the first connector and the second connector.

2. The high voltage electrical connector according to claim 1, wherein the first connector is a pair of pins.

3. The high voltage electrical connector according to claim 2, wherein the pins are structured and configured for electrical connection to a high voltage power supply.

4. The high voltage electrical connector according to claim 2, wherein the pins include non-conductive caps on one end thereof.

5. The high voltage electrical connector according to claim 1, wherein the second connector comprises a pair of bus bars.

6. The high voltage electrical connector according to claim 1, wherein the circuit protection device is a high voltage fuse.

7. The high voltage electrical connector according to claim 1, wherein the circuit protection device is a high voltage circuit breaker.

8. The high voltage electrical connector according to claim 1, wherein the outer layer is formed from conductive plastic.

9. The high voltage electrical connector according to claim 1, wherein the outer layer is formed from a layer of nickel over a layer of copper.

10. The high voltage electrical connector according to claim 1, wherein the outer layer is formed from conductive paint.

11. The high voltage electrical connector according to claim 1, wherein the outer layer is formed from metal mesh.

12. A high voltage electrical connector comprising:
    a first connector body portion;
    a second connector body portion;
    a pair of electrical wires having first and second ends;
    an electrical connector attached at a first end of each of the pair of electrical wires; and
    a high voltage circuit protection device electrically connected between the first end and the second end of one of the pair of wires;
    wherein the high voltage circuit protection device and a portion of the pair of electrical wires are supported within the first connector body portion; and
    wherein a portion of the first connector body portion is supported within the second connector body portion.

13. The high voltage electrical connector according to claim 12, wherein the electrical connector attached at a first end of each of the pair of electrical wires is an eyelet terminal.

14. The high voltage electrical connector according to claim 12, wherein the circuit protection device is a high voltage fuse.

15. The high voltage electrical connector according to claim 12, wherein the circuit protection device is a high voltage circuit breaker.

16. The high voltage electrical connector according to claim 12, wherein the first body portion comprises a non-conductive material, and wherein the first body portion includes an outer layer comprising conductive material.

17. A high voltage electrical connector comprising:
    a connector body;
    a pair of bus bars having first and second ends, the first and second ends defining electrical connectors; and
    a high voltage circuit protection device electrically connected between the first end and the second end of one of the pair of bus bars;
    wherein the high voltage circuit protection device and a portion of the pair of bus bars are supported within the connector body.

18. The high voltage electrical connector according to claim 17, wherein the second end of the pair of bus bars is electrically connected to a cavity block defining openings for receiving male connectors.

19. The high voltage electrical connector according to claim 17, wherein the circuit protection device is one of a high voltage fuse and a high voltage circuit breaker.

* * * * *